(12) United States Patent
Raj et al.

(10) Patent No.: US 11,658,955 B1
(45) Date of Patent: May 23, 2023

(54) METHODS, MEDIUMS, AND SYSTEMS FOR VERIFYING DEVICES IN AN ENCRYPTED MESSAGING SYSTEM

(71) Applicant: WhatsApp LLC, Menlo Park, CA (US)

(72) Inventors: Abhinav Raj, San Mateo, CA (US); Maaz Ali, New York, NY (US); Evan Christopher DeVrieze, Toronto (CA)

(73) Assignee: WhatsApp LLC, Menlo Park, CA (US)

( * ) Notice: Subject to any disclaimer, the term of this patent is extended or adjusted under 35 U.S.C. 154(b) by 23 days.

(21) Appl. No.: 17/348,014

(22) Filed: Jun. 15, 2021

(51) Int. Cl.
*H04L 29/06* (2006.01)
*H04L 9/40* (2022.01)

(52) U.S. Cl.
CPC .......... *H04L 63/068* (2013.01); *H04L 63/061* (2013.01); *H04L 63/0876* (2013.01); *H04L 63/0892* (2013.01); *H04L 63/18* (2013.01)

(58) Field of Classification Search
USPC ........................................................ 713/168
See application file for complete search history.

(56) References Cited

U.S. PATENT DOCUMENTS

| | | | |
|---|---|---|---|
| 9,282,181 B2* | 3/2016 | Antos | H04L 41/0853 |
| 9,673,973 B1* | 6/2017 | Leavy | H04L 9/0643 |
| 10,063,592 B1* | 8/2018 | McClintock | H04L 63/0869 |
| 10,158,489 B2 | 12/2018 | Shastri et al. | |
| 2014/0045472 A1 | 2/2014 | Sharma et al. | |
| 2014/0059351 A1 | 2/2014 | Braskich et al. | |
| 2015/0085848 A1 | 3/2015 | Reunamaki et al. | |
| 2016/0066183 A1 | 3/2016 | Conant et al. | |
| 2016/0360407 A1 | 12/2016 | Benoit et al. | |
| 2017/0012950 A1 | 1/2017 | Kim et al. | |
| 2017/0041354 A1* | 2/2017 | Lattanzi | H04L 65/1089 |
| 2017/0195339 A1* | 7/2017 | Brown | H04W 4/80 |
| 2019/0239068 A1 | 8/2019 | Mudulodu et al. | |

(Continued)

FOREIGN PATENT DOCUMENTS

WO 2019136107 A1 7/2019

OTHER PUBLICATIONS

EPO—International Search report and Written Opinion for International Application No. PCT/US2022/033160, dated Oct. 12, 2022, 9 pages.

*Primary Examiner* — Sanchit K Sarker
(74) *Attorney, Agent, or Firm* — McDermott Will & Emery LLP

(57) ABSTRACT

This application describes methods, mediums, and systems for verifying a device for use in a messaging system. Using the device verification procedures described, a messaging system can securely authorize new devices to send and receive encrypted messages on behalf of a user, preferably without the need to share a private encryption key between the users' different devices. The application describes several techniques that can be used to provide such a system, including distributing a computer-perceptible code that encodes encryption information between a secondary device and a primary device. This allows the information to be distributed without intervention by a server. Other techniques provide unique ways to build and reverify authorized device lists, distribute encryption keys in chat channels, ensure that lists of authorized devices are distributed in the correct order and remain valid for an appropriate amount of time, add new devices to an ongoing or new conversation, and more.

20 Claims, 8 Drawing Sheets

(56) References Cited

U.S. PATENT DOCUMENTS

2019/0296969 A1    9/2019   Zimny et al.
2020/0104081 A1    4/2020   Miyake
2021/0350446 A1*   11/2021   D'Haenens .......... G06Q 20/322

* cited by examiner

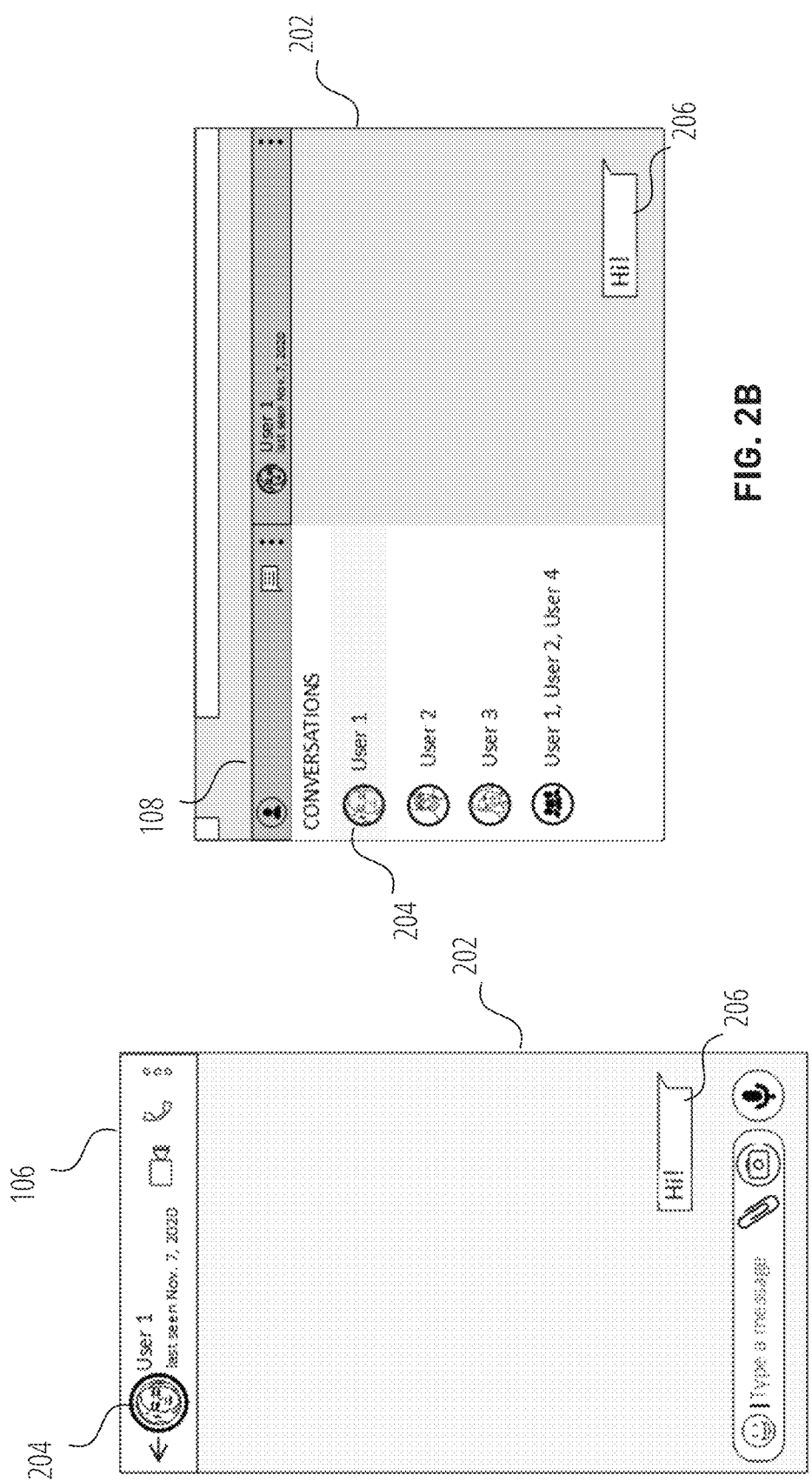

METHODS, MEDIUMS, AND SYSTEMS FOR VERIFYING DEVICES IN AN ENCRYPTED MESSAGING SYSTEM

BACKGROUND

Messaging systems may allow users to interact with each other in conversational threads involving two or more users. In some types of messaging systems, each user may be associated with a particular primary device that serves as a source of truth for the user. For example, the read/unread status of the messages may be defined by the primary device, the customized names assigned to contacts in the user's contacts list may be defined by the primary device, etc. In other types of messaging systems, there is no primary device—a user may log into the messaging system from any location and make changes to their account, which are treated as official changes no matter which device was used to make them.

Some messaging systems use encryption to ensure that messages can be transmitted securely. For example, a messaging system may be end-to-end encrypted (E2EE), meaning that messages are encrypted and decrypted on end-user devices. Any computing systems situated between the end-user devices, such as servers of the messaging system, may not be privy to the encryption keys needed to decrypt the messages, and therefore do not have access to the message content. Many such systems use a version of public key cryptography, in which a device advertises a public key that can be used to encrypt messages for the device. That device can then use a secret private key to decrypt the messages; because the device is the only one with the private key, only that device can decrypt the messages.

BRIEF SUMMARY

It is contemplated that the embodiments described below may be used separately or in combination. The attached Figures show the embodiments described below as a unified process, although individual parts of that process can be separated in order to achieve advantages as described herein. Furthermore, the summaries below may be described from a certain perspective (e.g., the primary device, the secondary device, the server, another participant in the conversation). It is understood that the invention is not limited to the specific actions as performed by the particular devices identified below. One of ordinary skill in the art will understand that complimentary actions are performed on the other devices, as described more fully in the Detailed Description that follows, in response to the specific actions summarized below. Thus, the phrases "in one embodiment," "in another embodiment," etc. as used herein are not intended to exclude those embodiments from being used together. For example, if a first embodiment is introduced by "in one embodiment," and a second embodiment is introduced by "in another embodiment," it is contemplated that the first and second embodiments could be used together or separately.

According to an embodiment, a secondary device associated with a user in an encrypted messaging system may generate a computer-perceptible code that encodes encryption credentials for the secondary device. The computer-perceptible code may be, for example, a visual code such as a QR code that is presented on the secondary device and read by the primary device. Alternatively or in addition, the computer-perceptible code may be another type of visual code or a non-visual code, such as a sound code, haptic code, etc.

The encryption credentials may be one or more public encryption keys, as described in more detail below. In some embodiments, the primary device and the secondary device have different encryption credentials in the encrypted messaging system. In some embodiments, the encryption credentials may include a device identity key an authorization key generated for the secondary device at a time of registering the secondary device with the encrypted messaging system.

The computer-perceptible code may be presented to a primary device associated with the user. The code and/or underlying messaging application may be configured to prompt the primary device to add the secondary device to add the secondary device to an approved device list with the encrypted messaging system.

The secondary device may receive, from a server of the encrypted messaging system, a request to confirm that the secondary device is to be added to the approved device list. The secondary device may verify that the request was generated based on the encryption credentials and, if this is verified, may confirm the request. In some embodiments, verifying the request may involve determining that the request was signed using the identity key for the secondary device. In some embodiments, the encryption credentials embedded in the computer-perceptible code may include a secret pairing key that is configured to be maintained in confidence by the primary device. In these embodiments, verifying the request may include confirming that the request comprises a payload signed by the secret pairing key.

In some embodiments, the secondary device may extract information signed by the primary device from the request, re-sign the extracted information, and transmit the re-signed information to the server. This may confirm to the server the secondary device's intent to be able to send and receive messages on behalf of the user in the conversation. Based on receiving this signed information, the server may add the device to the authorized device list and establish an encrypted communication session with the secondary device.

In some embodiments, after the secondary device confirms the request, the secondary device may receive identifying information for the primary device from the server. One advantage of the embodiments described above is that verification can take place in the physical realm (by exchanging the computer-perceptible code directly between the primary and secondary devices). This provides information about the secondary device to the primary device, but the secondary device may still need to communicate with the primary device (e.g., to retrieve settings and other information for the user's account). To achieve this, the sever can provide the primary device's public keys after the secondary device has been added to the authorized device list so that the secondary device can set up an encrypted session directly with the primary device.

In another embodiment, a primary device associated with a user in an encrypted messaging system may receive a computer-perceptible code from a secondary device. The primary device may retrieve a reference from the computer-perceptible code, the reference configured to identify a location of the secondary device in the encrypted messaging system. In some embodiments, the encrypted messaging system may be represented as a set of interconnected nodes representing messaging servers, and the reference identifies a specific node to which the secondary device is connected.

The primary device may generate a request to add the secondary device to a list of authorized devices of the user, the request configured to identify the secondary device to a server of the encrypted messaging system based on the reference. The primary device may transmit the request to the server.

In some embodiments, the computer-perceptible code may further include an identifier for the secondary device, and the request is further configured to add the identifier of the secondary device to the list of authorized devices.

In some embodiments, the primary device may generate a signature based on a list of currently authorized devices known to the primary device, wherein the request further comprises the signature. Furthermore, the primary device may extract a secret pairing key from the computer-perceptible code. The signature based on the list of currently authorized devices may be encrypted with the pairing key.

In some embodiments, the primary device is the only device associated with the user that is authorized to generate requests to add additional devices to the list of authorized devices. For instance, the list of authorized devices may need to be signed by the primary device in order to be valid. In further embodiments, the primary device does not receive identifying information about the secondary device from the server, but rather receives it solely from the secondary device directly.

In another embodiment, a server of an encrypted messaging system may receive a request to add a secondary device to a list of authorized devices associated with a user, the request received from a primary device of the user.

The request may include a request time stamp. The time stamp may be embedded with an encrypted authorized device list included in the request. The encrypted authorized device list may be signed by an identity key of the primary device. The server may transmit a first current server time to the primary device.

In response to receiving the first current server time, the primary device may verify that the current primary device time is within a first predetermined time interval from the first current server time, the confirmation comprising a confirmation time stamp. The confirmation may be received at the server.

This process may allow the client and server to agree upon a current time. This may be particularly useful when, as in some embodiments, the encrypted messaging system does not guarantee that messages are presented in a chronological order (and therefore does not generally have a built-in system-wide time synchronization procedure).

The server may determine whether a second current server time is within a second predetermined time interval of the current primary device time, and may accept or reject the original request based on the determining. If the request is accepted, the server may add the secondary device to the authorized device list.

After a predetermined expiration time has elapsed since the request time stamp, the server may remove the secondary device from the list of authorized devices.

In some embodiments, the server may determine a set of conversation participants to receive the list of authorized devices and a most recent list of authorized devices associated with the user based on the request time stamp. The server may transmit the most recent list of authorized devices to the conversation participants.

According to another embodiment, a server of an encrypted messaging system may access a list of authorized devices associated with a user, the list being cryptographically signed by a primary device of the user, wherein the cryptographic signature is associated with a timestamp. Each device in the list of authorized devices may be associated with a cryptographic key stored on the server.

The server may identify a time window during which the cryptographic signature remains valid, determine whether a current time is within the time window and, if the current time is not within the time window, automatically expire the list of authorized devices.

In some embodiments, the server may receive a message for the user, determine that the current time is within the time window, and forward the message to each of the devices in the list of authorized devices.

In another embodiment, the server may receive a request from a logged-in device in the list of authorized devices to manually retire the logged-in device from the list of authorized devices, and in response may destroy the cryptographic key associated with the logged-in device.

In some embodiments, they server may determine an amount of time since a selected device from the list of authorized devices was last online, determine that the amount of time exceeds a predetermined maximum amount of time, and destroy the cryptographic key associated with the selected device.

In yet further embodiments, the server may receive a request to add a new device to the list of authorized devices and may authorize the request and add the new device to the list. The server may wait a predetermined period of time after authorizing the request, and may transmit a notification that the new device has been added to the list to the primary device after the predetermined period of time has elapsed. The server may, in some cases, receive a response to the notification from the primary device requesting that the new device be removed from the list of authorized devices and remove the new device from the authorized device list.

Other embodiments allow the authorized devices in a conversation to be reviewed and re-verified throughout the course of the conversation. In one embodiment, a recipient device (e.g., representing a participant in a conversation with another user who is associated with a primary device and a secondary device) may receive an encrypted message that is part of a conversation in an encrypted messaging system. The recipient device may extract from the message a representation of a cryptographic set of identifiers associated with a set of devices authorized to participate in the conversation. The representation may be a hash of a set of keys for the set of devices. The recipient device may verify that the set of devices matches a list of authorized devices stored at the recipient device.

One of the devices in the set of devices may be a primary device of a user of the messaging system. The recipient device may receive a notification from a server of the encrypted messaging system indicating that a secondary device for the user has been added to the conversation and may add the secondary device to the list of authorized devices stored at the recipient device. In some embodiments, the notification may include an identifier for the new device signed by the primary device. The recipient device may verify that the signature on the identifier is valid based on cryptographic information about the primary device stored on the recipient device. In some embodiments, the recipient device may receive a new message from the secondary device and a cryptographic key associated with the secondary device, the cryptographic key received in association with metadata. The recipient device may verify a validity of the cryptographic key by comparing the metadata to metadata previously received with the notification. The recipient device may use the cryptographic key to decrypt the new message.

In some embodiments, the recipient device may receive an original message from a secondary device of a sending user, the sending user associated with a primary device and the secondary device in the encrypted messaging system. The recipient device may extract, from the original message, a cryptographic key for the secondary device, a cryptographic key for the primary device, and a list of authorized devices signed by the primary device. The recipient device may then use the cryptographic keys for the primary device and the secondary device to establish encrypted sessions with the primary device and the secondary device, and may use the cryptographic keys to transmit a new message to the sending user. In some embodiments, the recipient device may add the list of authorized devices received in the original message to the list of authorized devices stored at the recipient device.

In another embodiment, a recipient device may receive, from a server in an encrypted messaging system, a list of devices authorized to participate in an encrypted conversation, wherein the list of devices comprises a primary device and a secondary device associated with a user. The recipient device may verify that the device list was signed by the primary device, and may use the device list to send a message to the user.

When sending the message to the user, the recipient device may use a first cryptographic key associated with the primary device and a second cryptographic key associated with the secondary device to encrypt the message, and the first and second cryptographic keys are received separately from the list of devices. The first and second cryptographic keys may be received after the list of devices. The primary and secondary devices may have different cryptographic keys.

The recipient device may verify that the first and second cryptographic keys were signed by the primary device. This may be performed after verifying that the device list was signed. This may be particularly advantageous when the first and second cryptographic keys have a size that is larger than a size of the list of devices.

This brief summary is intended as an introduction to the subject matter of the present application, which will be described in more detail below.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates an exemplary user interface on a primary device while the primary device participates in a conversation, in accordance with one embodiment.

FIG. 2B illustrates an exemplary user interface on a secondary device, while the secondary device participates in the same conversation as shown in FIG. 2A in accordance with one embodiment.

DETAILED DESCRIPTION

Figure 1B:
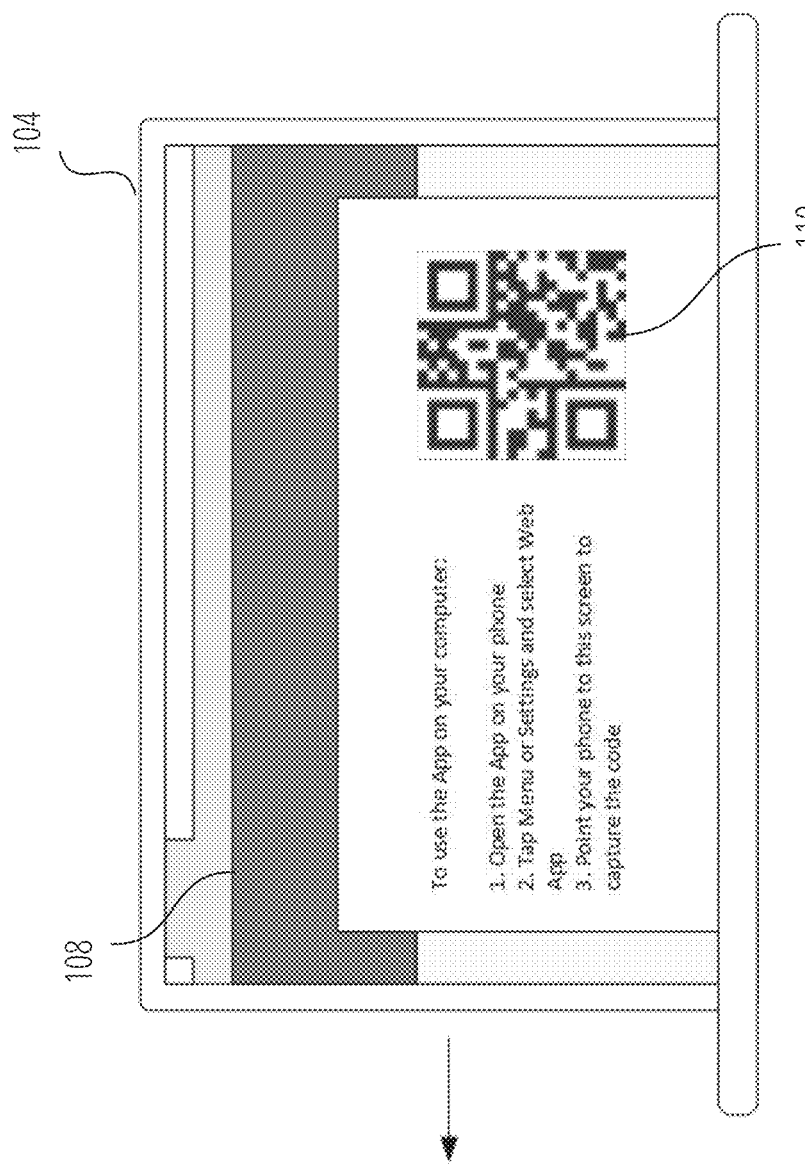
FIG. 1B illustrates an exemplary secondary device performing a device verification process in accordance with one embodiment.

As noted above, some types of encryption systems rely on a primary device that serves as as source of truth for a user in a messaging system. Systems that use a primary device are well-suited to public key cryptography, because the private key can reside on only a single device (the primary device). Thus, the public key does not need to be shared between multiple different devices. This is advantageous because, if the private key is capable of being shared to different devices, there is always a chance that an unauthorized device may be able to infiltrate the system and illicitly receive a copy of the private key. The intruder could then decrypt messages intended for the user, thus overcoming the cryptographic security of the system. If the private key were compromised in this way, the user would need to destroy their private key, generate a new one with a corresponding public key, and then advertise the public key to all recipients again. Any messages sent with the old private key would be presumed compromised. Meanwhile, because the system allows the private key to be shared, the intruder could obtain the new private key again.

Despite these problems, there are also limitations to a system that only allows a user to send and receive messages on a single primary device. A user may not wish to use the primary device for a number of reasons—for instance, the primary device may be a phone that is currently low on battery, or the user may prefer to use a computer or tablet with a larger keyboard and screen. In some situations, the user might not always have access to their primary device and might wish to authorize the use of a secondary device for certain periods of time.

Thus, there is a need for a system that can securely authorize new devices to send and receive encrypted messages on behalf of a user, preferably without the need to share a private encryption key between the devices. The present application is directed to several techniques that can be used to provide such a system.

Using protocols described herein, a user's primary device may verify another secondary device to participate conversations on behalf of the user, without relying on verification by a central server. A primary device may add a secondary device to the user's account by physically interacting with the secondary device (e.g., by scanning a visual code, receiving a sound pattern, etc.) and may use this physical interaction to register the secondary device with the user's account. In particular, the secondary device may generate or be provided with cryptographic credentials, such as cryptographic keys, that can be used to establish an encrypted communication session with the secondary device (e.g., an identity key, an authentication key, etc.). In addition to these keys, the secondary device may generate a special pairing key for use in the pairing process; the pairing key is known only to the secondary device and is provided only to the primary device. When the pairing key is embedded in the computer-perceptible code, it can be provided directly to the primary device in the physical realm without the need to pass it, unencrypted, to the server. Furthermore, the secondary device may be provided with a reference by a server of the messaging service that the secondary device is connected to. This information, when provided to the primary device, allows the primary device to identify the secondary device in the communication network.

This information (the identity key, authentication key, pairing key, and reference) may be encoded in the visual code and sent directly to the primary device. For example, if this information is encoded in a visual code such as a QR code or bar code, the primary device may scan the visual code directly from the secondary device. The primary device can then read the encoded information from the code.

The primary device may maintain a current list of devices that are authorized to engage with the encrypted messaging system on behalf of the user. For example, the list of devices may take the form of a list of identity keys corresponding to the secondary devices for the user's account. The primary device may add the secondary device identity key received in the code to the list of authorized devices, and may optionally remove any outdated devices. The primary device may digitally sign the list with the primary device's identity key, and may also create a secondary device signature using the identity key of secondary device. The signed device list and secondary device signature may be loaded into a payload, and the payload may be encrypted with the secret pairing key. The encrypted payload may then be sent to a server of the messaging system (along with the secondary device's authentication key, which allows the server to immediately communicate with the secondary device without the need to send a setup message to retrieve the authentication key). The primary device may identify the secondary device to the server using the reference retrieved from the code, so that the server can identify the location of the secondary device in the communications network and exchange messages with the secondary device.

At this stage, the server is unable to examine the payload because the payload was encrypted with the secret pairing key that was shared directly between the primary and secondary devices through the code. The server simply forwards the payload to the secondary device, using the reference received from the primary device to identify the secondary device's location and the authentication key received from the primary device to establish an encrypted session with the secondary device (at least saving a round trip communication with the secondary device to obtain the secondary device's authentication key).

Upon receiving the payload from the server, the secondary device may decrypt the payload using the pairing key. This validates for the secondary device that the communication did come from the primary device, since the pairing key was only known to the primary and secondary devices. The secondary device then performs several other steps to validate the request. The secondary device may retrieve the secondary device signature created by the primary device, and may verify that the identity key used to create the signature is, in fact, the signature for the secondary device.

Meanwhile, the secondary device can be considered validated by the primary device, because the primary device had to receive the computer-perceptible code directly from the secondary device (indicating that the secondary device was physically in the presence of the primary device, and by extension the user of the account, when the secondary device was authorized).

After the primary and secondary devices have validated each other using this process, the secondary device may then take the device list that was signed by the primary device and re-sign the list with its own identity key. This re-signed list may then be uploaded to the server, which can send the signed list to any other conversation participant that wants to communicate with the primary and/or secondary devices associated with the user's account.

Using these techniques, the server does not need to verify any of the devices or the device lists. Because the authorized device list is signed by the primary device of a user account, any recipient device can verify the integrity of the device list by using the primary device's identity key to confirm the signature. Thus, for example, the server does not need to verify the authorized device list received from the secondary device when the secondary device is added; it can simply pass the signed device list off to recipients that need it, and the recipients can verify the list for themselves.

As noted above, when registering the secondary device, the primary device may add the secondary device to a list of authorized devices and may cryptographically sign the list. A cryptographic signature refers to a construct wherein the signing device uses its private key to calculate a value that could only be generated using the private key. The device's public key can be used to verify that the signature is genuine. Thus, anyone receiving the signature that is also in possession of the signer's public key can verify that the message was, in fact, signed by the signing device and that the information in the message can therefore be trusted. This adds security to the authorized device list, because a signed list could only be generated by the user's primary device (and thus an illicit device cannot simply insert itself into the list of authorized devices).

Although this verification process may make use of a server to facilitate adding the secondary device to the user's account, the verification process itself is carried out on the end user devices, and the server does not provide any of the information used to verify the devices. Because the verification process is carried out on the end user devices and not the server, the users can be confident that the server will not allow unauthorized devices to gain access to the user's account.

Nonetheless, an illicit device could theoretically be added to the user's account if the intruder gains physical access to the user's primary device. In order to address this situation, a user may be notified when a new device has been added to a thread, after a certain period of time has elapsed. The user may be allowed to deny the new device's participation in the thread. Furthermore, other participants in the conversation are also notified when any of the conversational participants adds a new secondary device to their account. This allows the other conversational participants to exercise caution when sending new messages, in case they are worried that the new secondary device might be an intruder into the conversation.

Furthermore, the primary and secondary devices do not share private encryption keys. Instead, a new encryption key pair is created for the secondary device and the public half of the key pair is advertised to other participants in a conversation. This allows those participants to establish an encrypted session with the secondary device, which allows messages to be passed securely. In the event that an illicit device is added to the user's account (e.g., because the intruder gained temporary physical access to the user's primary device), then the illicit device can be removed from the authorized device list simply by destroying the keys assigned to that device. It is not necessary to regenerate the private keys for the primary device and any legitimate secondary devices.

Some embodiments may be used to add a new device to a conversation. These embodiments generally fall under two scenarios.

In a first scenario, a participant in an ongoing conversation has already established a cryptographic session with a primary device of another user. A secondary device for the other user is then added. In this scenario, a server of the messaging service may transmit an ADD message informing the other participants in the conversation that a new device has been added. The ADD message may include a signature for the primary device of the user. The other conversational participants may, in response to receiving the ADD message, use the primary device's public identity key to verify the signature and therefore confirm that the secondary device is associated with the user of the primary device. If the signature does not match, a warning message may be displayed indicating that a potentially unauthorized device has entered the conversation.

If the signatures do match, then the participant's device may add the secondary device into the conversation. At this stage, the participant device knows the identity of the secondary device, but does not yet have the secondary device's cryptographic keys and therefore cannot yet securely communicate with the secondary device. When the secondary device sends a message into the conversation, or when another participant wishes to send a message that will be received by the secondary device, the secondary device's identity key may be retrieved from a server of the communication system. The key may be returned with metadata, such as a primary device signature or other means of identifying the message from the server. The same metadata may have been included on the original ADD notification, and the participant device may verify that the metadata associated with the identity key matches the metadata associated with the ADD notification. If the metadata matches, the secondary device may be considered verified and an encrypted communication session may be established with the secondary device. If it does not match, the participant device may request that secondary device resend the message to demonstrate that the message is not malicious. An error message may also be displayed.

A second scenario is one in which the participant device does not have an active session with the primary device when the secondary device is added. In this case, the server will not send the above-noted ADD message to the participant device. Instead, the participant device will either send a message to the user whose account supports the primary and secondary device, or a message will be received at the participant device from an unknown secondary device. With the message, the participant device may receive the public key of the secondary device, a signed authorized device list confirming that the secondary device is one of the authorized devices associated with the primary device, and the identity key of the primary device. The participant device can use the received information to establish a session with the primary device and the secondary device. When the participant device wishes to send a message, it can continue to use the keys received with the earlier message to encrypt the new message.

In some embodiments, the list of authorized devices for a conversation is continuously sent into the conversation on the chat channel (e.g., as metadata with every message, or with a subset of messages, in the conversation). This allows the conversation participants to continuously reverify the devices that they expect to be in the conversation.

In some embodiments, the signed authorized device list might expire after manual input, such as when a user's primary device instructs the server to remove a secondary device from the list. The list may also automatically expire under certain conditions (e.g., after a certain period of time). In order to ensure that the device list expires at the right time, the signature on the list may be associated with a time stamp. The server storing the device list and the primary device may need to agree on the current time so that the time stamp reflects their common understanding of the time, at least within a certain window. For instance, a user might manually set their clock back—in some cases, a user might even set their clock to the wrong year, either inadvertently or deliberately. This could cause the server to prematurely expire certain lists, or to keep other lists longer than the intended time window.

Even when the server does not expire the list after a period of time, it may still be necessary to ensure an accurate timestamp so that the server does not replay old information. With an accurate timestamp, the server can ensure that it only presents information in an increasing chronological order. Thus, the server can avoid the situation where the server advertises a list of authorized devices from six months ago, then advertises a current list of devices, then another list of authorized devices from four months ago. In that situation, a user might have removed an authorized device in the current list of devices, whereas the list from four months ago might still include the device. When played in this order, that device would continue to be presented as authorized even though the user de-authorized the device recently.

As can be seen above, the conversation participants need to receive both the list of authorized devices and the public encryption keys used to communicate with those devices. According to some embodiments, these pieces of information are passed to the participants using a chat channel on which messages are exchanged in the messaging service. The list and the keys may be passed separately, and the list may be passed to the participants before the keys. Because the list is typically of a smaller size than the cryptographic keys, this allows the verification process to proceed in a lazy manner, with verification of the device list happening before verification of the keys. If a user decides to reject a device in the device list, then there is no need to proceed to the more processing-intensive task of receiving and verifying that device's keys.

This brief summary is intended to serve as a non-limiting introduction to the concepts discussed in more detail below. However, before discussing further exemplary embodiments, a brief note on data privacy is first provided. A more detailed description of privacy settings and authentication will be addressed in connection with the following Figures.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

Exemplary Embodiments

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-*a* may include components 122-1, 122-2, 122-3, 122-4, and 122-5. The embodiments are not limited in this context.

Cryptographic Background

In order to better understand the terminology and processes used herein, a general description of an end-to-end cryptographic system suitable for use with exemplary embodiments is first provided.

In order to use a cryptographic messaging service, a user may first register their client device with the service after installing the service on the device. The client may transmit, to a server of the messaging service, a public identity key, a public signed pre key, and a batch of public one-time pre keys.

The public identity key may represent the public portion of a public/private key pair (e.g., a long-term Curve25519 key pair) generated at the client device when the service is installed on the device.

The public signed pre key may represent the public portion of another key pair (e.g., a medium-term Curve25519 key pair), generated at install time and signed by the identity key. The signed pre-key may be rotated on a periodic timed basis.

The public one-time pre keys represent the public portion(s) of a queue of key pairs (e.g., Curve25519 key pairs) for one-time use. The one-time pre keys may be initially generated at install time and replenished as needed.

These keys may be transmitted to the server, which may associate them with the user's identifier and store them for later use.

When a registered user wishes to use the messaging service to communicate with a recipient, the user's device (referred to as the initiating client) establishes a cryptographic session with the service. In order to do that, the initiating device requests the public identity key, public signed pre key, and a single one-time pre key for the recipient. The server returns the requested values and removes the one-time pre key from storage. The initiator saves the recipient's identity key as $I_{recipient}$, the signed pre key as $S_{recipient}$, and the one-time pre key as $O_{recipient}$.

The initiator then generates an ephemeral key pair, $E_{initiator}$, and loads its own identity key as $I_{initiator}$. The received and calculated values may be used calculate a master secret. In one example, the secret may be calculated based on the Elliptic-Curve Diffie-Hellman (ECDH) algorithm, as follows:

$$\text{master\_secret} = \text{ECDH}(I_{initiator}, S_{recipient}) // \text{ECDH}(E_{initiator}, I_{recipient}) // \text{ECDH}(E_{initiator}, S_{recipient}) // \text{ECDH}(E_{initiator}, O_{recipient})$$

The initiator uses a key derivation function (such as HKDF) to create a root key and chain keys from the master_secret.

The initiator can then use this information to send messages to the recipient. Until the recipient responds, the initiator includes any information that the recipient requires to build a corresponding session in the header of the initiator's messages. This may include, for example $E_{initiator}$ and $I_{initiator}$.

When the recipient receives a message that includes session setup information, the recipient calculates the corresponding master-secret using its own private keys and public keys advertised in the header of the incoming message. The recipient deletes the one-time pre key used by the initiator, and uses HKDF to derive a corresponding root key and chain keys from the master_secret.

An encrypted session is now established between the initiator and the recipient.

The encrypted session can be used to exchange messages between clients that are protected with a message key. The message key changes for each message transmitted and is ephemeral such that the message key used to encrypt a message cannot be reconstructed from the session state after a message has been transmitted or received.

The message key is derived form a sender's chain key, which ratchets forward with every message sent. Additionally, a new ECDH agreement is performed with each message roundtrip to create a new chain key. This provides forward secrecy through the combination of both an immediate hash ratchet and a round trip DH ratchet.

Each time a message is transmitted, an ephemeral public key is advertised along with it. Once a response is received, a new chain key and root key are calculated as:

$$\text{ephemeral\_secret} = \text{ECDH}(\text{Ephemeral}_{sender}, \text{Ephemeral}_{recipient})$$

$$\text{Chain Key}, \text{Root Key} = \text{HKDF}(\text{Root Key}, \text{ephemeral\_secret})$$

A chain is only ever used to send messages from one user, so message keys are not reused. Because of the message keys and chain keys are calculated, messages can arrive delayed, out of order, or can be lost entirely without any problems.

In some cases, the client may need to communicate with a server of the messaging service by exchanging encrypted messages. Because a key feature of end-to-end encryption is that the intermediate server(s) should not be able to decrypt the messages sent between user devices, it is necessary to generate a different key for client-server communication. This key is generally referred to as the authentication key, and is used for client-server communication in a manner similar to the identity key discussed above.

Traditional encrypted messenger apps typically employ "server-side fan-out" for group messages. A client wishing to send a message to a group of users transmits a single message, which is then distributed N times to the N different group members by the server.

This is in contrast to "client-side fan-out," where a client would transmit a single message N times to the N different group members itself.

Server-side fan out can be performed efficiently by building on the pairwise encrypted sessions outlined above. This is accomplished using sender keys. The first time a group member sends a message to a group, the sender generates a random chain key and a random signature key key pair. The sender combines the chain key and the public key from the signature key into a sender key message. The sender individually encrypts the sender key to each member of the group, using the pairwise messaging protocol explained above.

For all subsequent messages in the group, the sender derives a message key from the chain key and updates the chain key. The sender encrypts the message and signs the ciphertext using the signature key. The sender transmits the single ciphertext message to the server, which does server-side fan-out to all group participants. The hash ratchet of the message sender's chain key provides forward secrecy. Whenever a group member leaves, all group participants clear their sender key and start over.

Figure 1A:
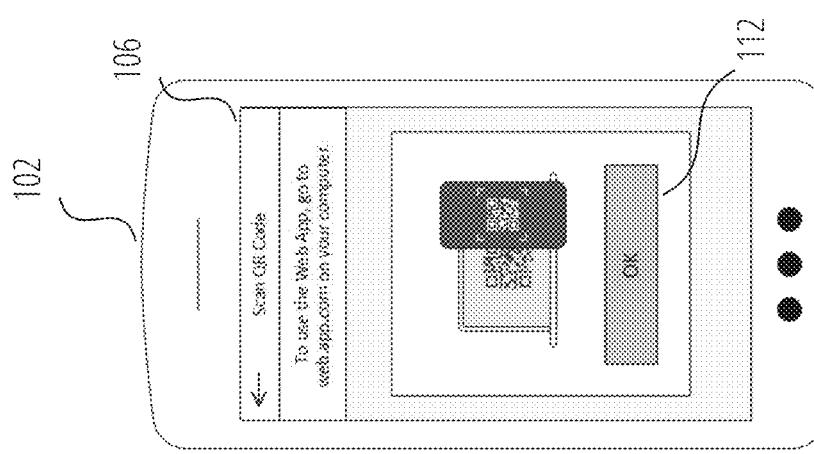
FIG. 1A illustrates an exemplary primary device performing a device verification process in accordance with one embodiment.

FIG. 1A depicts a first exemplary user interface 106 for a user device (in this example, a phone) serving as a primary device 102 for a user in an encrypted messaging service. For example, the service may be an end-to-end encrypted (E2EE) service.

The user interface 106 may be a graphical user interface (GUI) and may be associated with a user account of the encrypted messaging service. For example, the encrypted message service may receive a user name, password, and/or other security credentials to identify a user account. A user interface 106 specific to the account may be displayed on the primary device 102. In this example, the primary device 102 is a mobile phone, although a primary device 102 may take other forms such as a desktop computer, a laptop computer, a tablet, etc.

As shown in FIG. 1B, a user may wish to access their account for the encrypted messaging service via a secondary device 104, which may be a laptop, a secondary mobile phone, a desktop computer, or other network-interfacing device. In various embodiments, the secondary device 104 may be verified and/or authenticated so that the secondary device 104 can send and receive messages in the encrypted messaging service on behalf of the user account. This verification/authentication may be performed without entrusting cryptographic keys and/or other authentication responsibility to a separate server or device.

In particular, the secondary device 104 may generate and/or receive one or more cryptographic keys for device verification, as discussed above. To this end, the secondary device 104 may register with the encrypted messaging service and may generate an identity key, as discussed above. The secondary device 104 may use the identity key to derive other cryptographic keys.

Figure 4A:
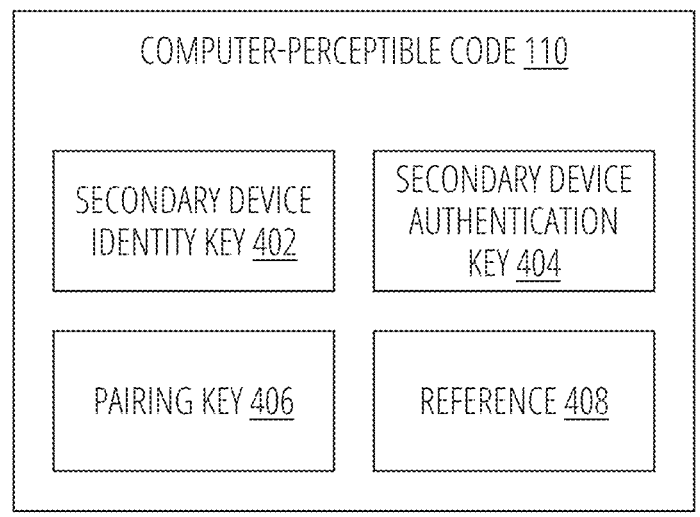
FIG. 4A depicts an exemplary data structure corresponding to a computer-perceptible code in accordance with one embodiment.

In order to associate the secondary device 104 with the user account, the secondary device 104 may generate a computer-perceptible code 110 based on the cryptographic keys, which may then be presented on and/or otherwise displayed via a user interface 108 on the secondary device 104. The computer-perceptible code 110 may be, in many embodiments, a quick response (QR) code, which may include one or more of a secondary device identity key 402, a secondary device authentication key 404, and/or a pairing key 406, as are described, for example, with respect to FIG. 4A. The user interface 108 may be, for instance, a web browser interface, a web app, or the like.

The user interface 106 may guide a user to register the computer-perceptible code 110 with the primary device 102. In some embodiments, the primary device 102 may register the computer-perceptible code 110 via a camera or image capture. For example, the primary device 102 may receive the computer-perceptible code 110 as a captured image using an instruction element 112 presented in the user interface 106. In this way, the cryptographic keys of the secondary device 104 may be received by the primary device 102 directly and/or without the need for passing of such information along a network, via an intermediate server.

The primary device 102 may accordingly use the information included in computer-perceptible code 110 to verify the secondary device 104 for use, as described in detail below. As illustrated in FIG. 2A and FIG. 2B, the user interface 108 of the secondary device 104 may thus access one or more message threads 202 associated with the user account of the primary device 102.

In particular, a message thread 202 may be associated with one or more participants 204 additionally to the user account and may include one or more messages 206. The user interface 106 and the user interface 108 may be configured to update in association with each other, for example, so that sending the message 206 into the message thread 202 via the user interface 106 causes the message 206 to appear in the message thread 202 on the user interface 108.

Figure 3:
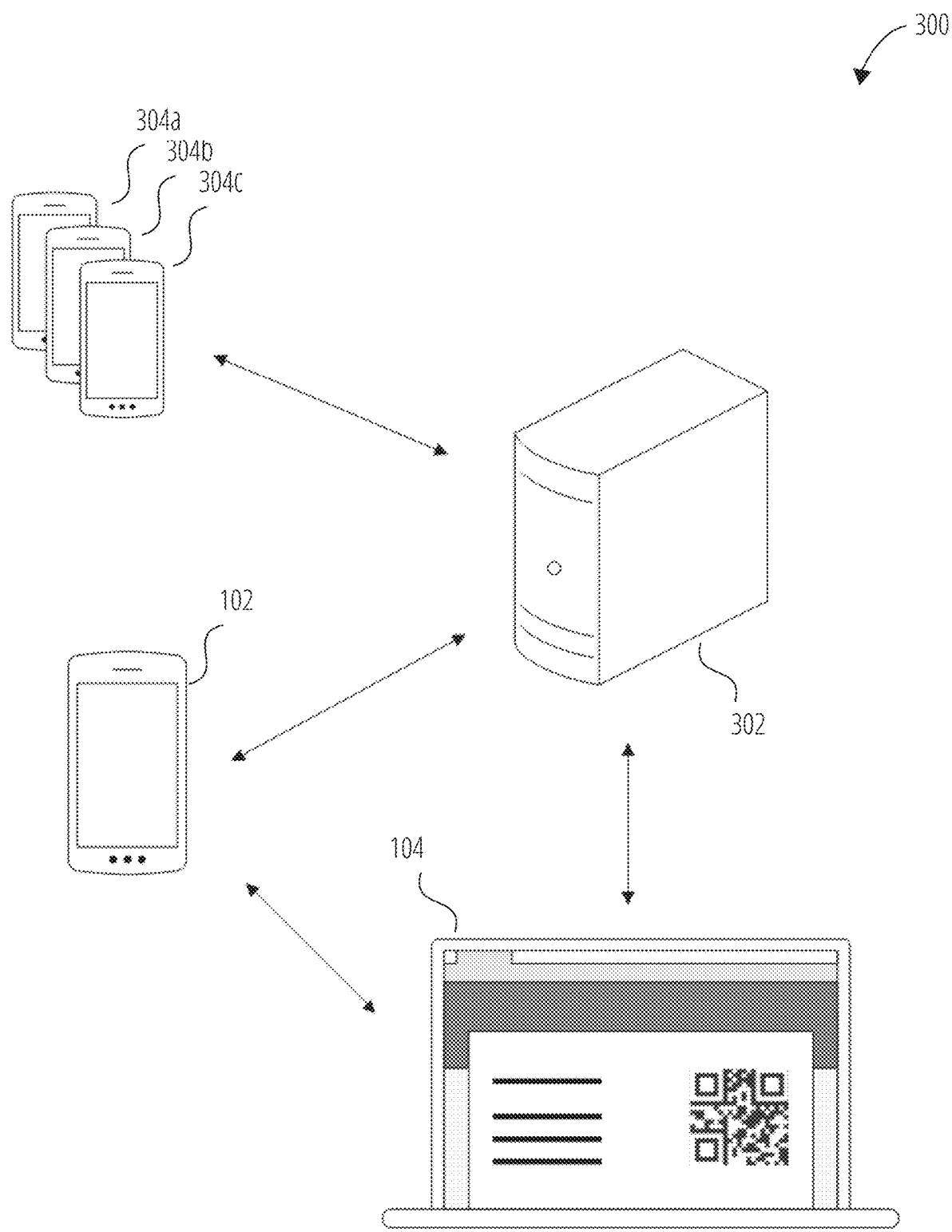
FIG. 3 illustrates an exemplary environment suitable for practicing exemplary embodiments.

FIG. 3 is an example of an environment 300 according to an exemplary embodiment, in which a primary device 102 and a secondary device 104 of a first user may be communicatively coupled to a server 302 and one or more additional participant devices 304a, b, c, etc.

In particular, the primary device 102 and the secondary device 104 may be associated with the same user account of a communication system (e.g., an E2EE messaging system). The participant device 304a, b, c, may be additional client devices associated with at other users of the messaging system. These additional clients may be participating with the user of the primary device 102 and the secondary device 104 in a conversation or thread.

The server 302 may include a network-enabled interface and/or logic to manage communications between the primary device 102, the secondary device 104, and the participant devices 304a, b, c (for example, via an internet connection).

As indicated in FIG. 3, the primary device 102 and the secondary device 104 may be configured to pass one or more packages of information directly between each other without using the server 302 as an intermediary. For example, the secondary device 104 may generate a computer-perceptible code 110, as discussed above, and the primary device 102 may receive the computer-perceptible code 110 directly from the secondary device 104, without the secondary device 104 transmitting any information to the server 302. The computer-perceptible code 110 may encode information allowing the primary and secondary devices to verify each other, such as the information depicted in FIG. 4A.

The computer-perceptible code 110 may encode a secondary device identity key 402, which may be an identity key assigned to (or generated by) the secondary device when the secondary device registered with a server of the messaging service. The computer-perceptible code 110 may also encode a secondary device authentication key 404, assigned or generated in a similar manner. Whereas the secondary device identity key 402 allows different client devices to securely communicate with each other in an E2EE framework, the secondary device authentication key 404 allows the client devices to communicate securely with the server. The secondary device identity key 402 and secondary device authentication key 404 may each represent the public half of a public/private key pair. An example of a technique for generating an identity key and an authentication key is described above.

The computer-perceptible code 110 may also encode a pairing key 406. The pairing key 406 may be a cryptographic key generated by the secondary device 104, and may be shared solely with the primary device 102 during the process of authorizing and validating the secondary device 104. The pairing key 406 may be the public half of a public/private key pair. The pairing key 406 is not shared with the server, and thus if the secondary device 104 receives a message encoded with the pairing key 406, the secondary device 104 can be confident that the message was generated by the primary device 102 (the only device to receive a copy of the pairing key).

Furthermore, the computer-perceptible code 110 may encode a reference 408. The messaging system may include multiple interconnected servers, which may be represented as a graph having nodes corresponding to the servers and edges connecting the nodes that are in communication with each other. The secondary device may be connected to one of the servers represented by a node, and the node information may be encoded in the reference 408. By passing the reference 408 to the primary device 102 in the computer-perceptible code 110, the secondary device 104 can identify its location in the network to the primary device 102 so that the primary device 102 can instruct the server 302 as to how to reach the secondary device 104.

Using the information encoded in the computer-perceptible code 110, the primary device may generate message to be sent to the secondary device to allow the secondary device to be added to an authorized device list. The message may include an encrypted pairing payload 410 that includes the information used by the secondary device to verify the integrity of the message and then pass an updated authorized device list to the server.

The pairing payload 410 may include a companion group signature 412. The companion group signature 412 may be generated by consulting a table of authorized secondary devices stored at the primary device. At this stage, the primary device 102 may optionally retire any outdated secondary devices by removing them from the table. The primary device 102 may take the identity keys for each of the secondary devices (which may be stored in the table), and put them together into a list. The primary device 102 may then generate a signature based on its own private identity key and sign the list. This signed list may serve as the companion group signature 412. The companion group signature 412 may be re-signed by the secondary device 104 and uploaded to the server during the verification process, and may then be redistributed to other conversation participants so that the conversation participants can be made aware of which secondary devices 104 are authorized for use by the primary device 102.

Figure 4B:
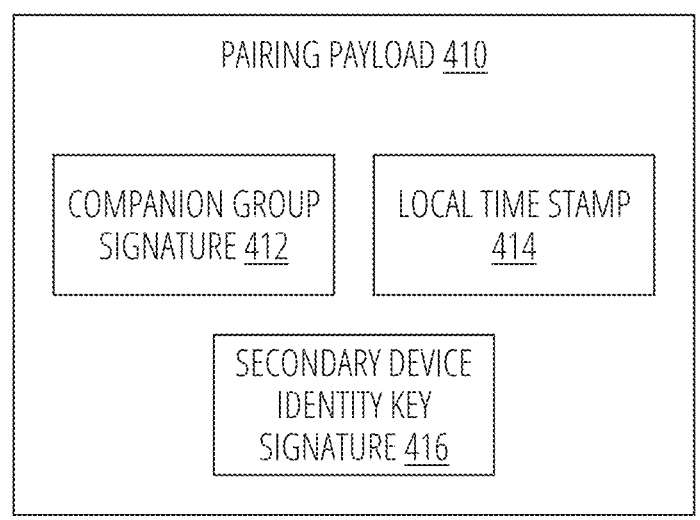
FIG. 4B depicts an exemplary data structure corresponding to a pairing payload in accordance with one embodiment.

The pairing payload 410 may also include a local time stamp 414, to be used by the server to ensure that the server's time is reasonably synchronized to the time on the primary device 102. This time synchronization process will be discussed in more detail below. Note that, although depicted within the pairing payload 410 in FIG. 4B, the local time stamp 414 will typically not be in the encrypted portion of the message that includes the pairing payload 410. Instead, the local time stamp 414 may be included in a header of a message that includes the pairing payload 410, so that it can be read and used by the server in the time synchronization process.

The pairing payload 410 may also include a secondary device identity key signature 416. This may be generated by taking the secondary device identity key 402 received in connection with the computer-perceptible code 110 and using it to create a signature that can be recognized by the secondary device 104. In this way, the secondary device can verify that the pairing payload 410 was created by the primary device 102 for the secondary device 104.

The pairing payload 410 (except for the local time stamp 414) may be encrypted using the pairing key 406 and transmitted to the server 302, along with the reference 408. The server can use the reference 408 to identify the location of the secondary device 104 and may forward the encrypted pairing payload 410 to the secondary device 104.

Figure 5:
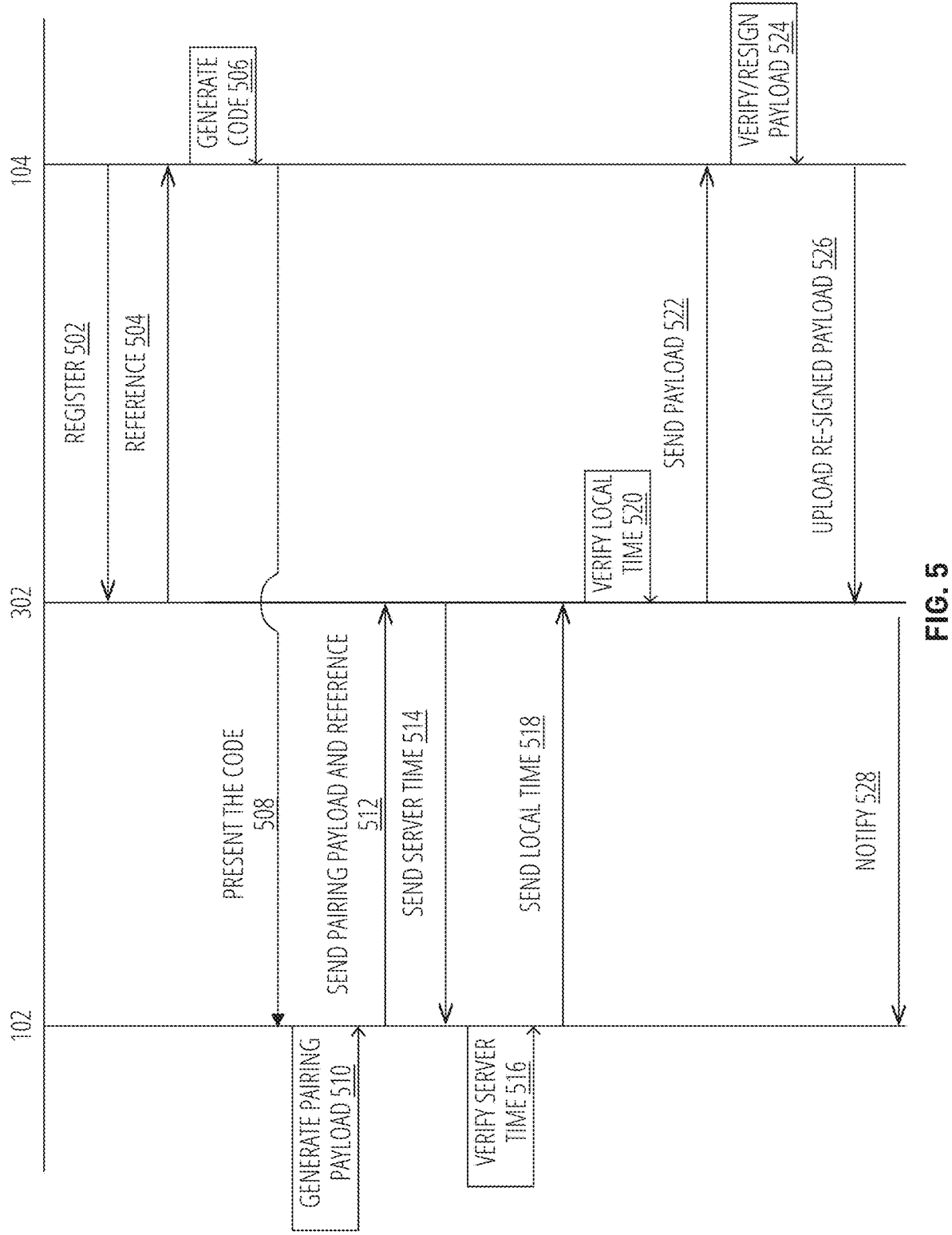
FIG. 5 is a data flow diagram showing an exemplary device verification process in accordance with one embodiment.

FIG. 5 is a data flow diagram depicting an exemplary device verification process according to an exemplary embodiment. The procedures described in connection with FIG. 5 (and FIG. 6) may be embodied as instructions stored on a non-transitory computer readable medium and implemented by one or more devices of an E2EE messaging system.

FIG. 5 depicts exemplary information exchange between the primary device 102, server 302, and secondary device 104. The device verification process may begin when the secondary device 104 sends a registration message 502 to the server 302 so that the secondary device 104 is initially registered with the messaging ion system. As part of registering the secondary device 104, the secondary device 104 may generate one or more encryption keys, including an identity key and an authentication key. Although the secondary device 104 and the primary device 102 may eventually be associated with the same user account, the keys generated for the secondary device 104 may be different than the keys used by the primary device 102.

The server 302 may, as part of registration or afterwards, send a reference message 504 to the secondary device 104. The reference message 504 may identify the node (e.g., server) that the secondary device 104 is connected to in the messaging system. Although the primary device 102 and secondary device 104 are depicted as communicating with the same server 302 in FIG. 5, this will not necessarily always be the case. The reference message 504 may also include any additional information needed by the server to identify the secondary device 104 and establish communication with the secondary device 104.

At some point, a user may initiate a procedure to add the secondary device 104 to a list of authorized devices for the user's account. For example, the user may navigate to a web page on the secondary device 104 that causes the secondary device 104 to start a code generation process 506. In the code generation process 506, the secondary device 104 may access the identity key and authentication key for the secondary device 104, the reference, and a pairing key configured to be shared with the primary device 102 and no other device. The secondary device 104 may encode this information and represent it as a computer-perceptible code.

The secondary device 104 may present the code 508 to the primary device 102. For example, if the code is a QR code, the secondary device 104 may display the code on a display screen, and the primary device 102 may capture the QR code using a camera of the primary device 102.

The primary device 102 may decode the information in the code, and may use the decoded information to generate a pairing payload 510. For instance, the primary device 102 may retrieve the identity key of the secondary device 104 and create a signature using the identity key. The primary device 102 may also add the identity key of the secondary device 104 to a list of approved devices, and may sign the list with the identity key of the primary device. The primary device 102 may encrypt the signature of the secondary device's identity key and the signed list of approved devices using the pairing key to generate a pairing payload. The primary device 102 may tag the pairing payload with a timestamp and may send the pairing payload and reference 512 to the server 302.

In response to receiving the pairing payload, the server 302 may attempt to verify that the time maintained by the server 302 is consistent or synchronized with the time maintained at the primary device 102. In some embodiments, the server 302 and primary device 102 may need to agree on a common time within a certain time frame (e.g., 24 hours). To that end, the server 302 may send the server time 514 to the primary device 102. The primary device 102 may verify the server time 516 by determining whether the server time is within a first predetermined time period (e.g., 24 hours) of the time at the primary device 102. If not, the primary device 102 may choose to update its time to be closer to the server time and retransmit the pairing payload with a new timestamp (or the primary device 102 could abort the pairing process).

If the time at the primary device 102 is within the first predetermined time period of the server time, then the primary device 102 may send the local time 518 at the primary device 102 to the server 302. The server 302 may then verify the local time 520 by determining whether the primary device 102 time is within a second predetermined time limit of the server (e.g., 60 seconds). If not, then the server 302 may reject the pairing process and the primary device 102 may try again after updating its system time. If the primary device 102 time is within the second predetermined period of time of the server 302, then the server 302 may proceed with the pairing process.

Accordingly, the server 302 may send the payload 522 to the secondary device 104. The server 302 may identify the secondary device 104 that is to receive the pairing payload based on the reference sent with the pairing payload. The secondary device 104 may receive the encrypted pairing payload and decrypt it with the pairing key that was originally included in the computer-perceptible code sent to the primary device 102. This servers as a first verification that the message was sent by the primary device 102, because only the primary device 102 had access to the pairing key. As a second verification, the secondary device 104 may retrieve the signature that was generated based on the identity key of the secondary device 104, and thereby verify that the pairing payload was generated specifically for the secondary device 104.

Once the secondary device 104 has verified the integrity of the pairing payload, the secondary device 104 may retrieve the signed list of approved devices, re-sign it with the identity key of the secondary device 104, and uploads the re-signed payload 526 to the server 302. The server 302 may then update the list of devices authorized to be used with the user's account with the re-signed device list received from the secondary device 104. The server 302 can then send the identity keys in the signed device list to any recipient devices that require the encryption credentials of the secondary devices authorized to be used with the user account.

The server 302 may wait a predetermined period of time after updating the authorized device list, (e.g., 30-40 minutes) and then may transmit a notification that new device was added 528. Waiting for this period of time allows the system to accommodate for a situation where an intruder gains access to the user's primary device 102, uses it to add a secondary device 104, and then returns the primary device 102. When the user is subsequently notified that a new secondary device 104 has been added to their account, they can manually remove the secondary device 104.

Figure 6:
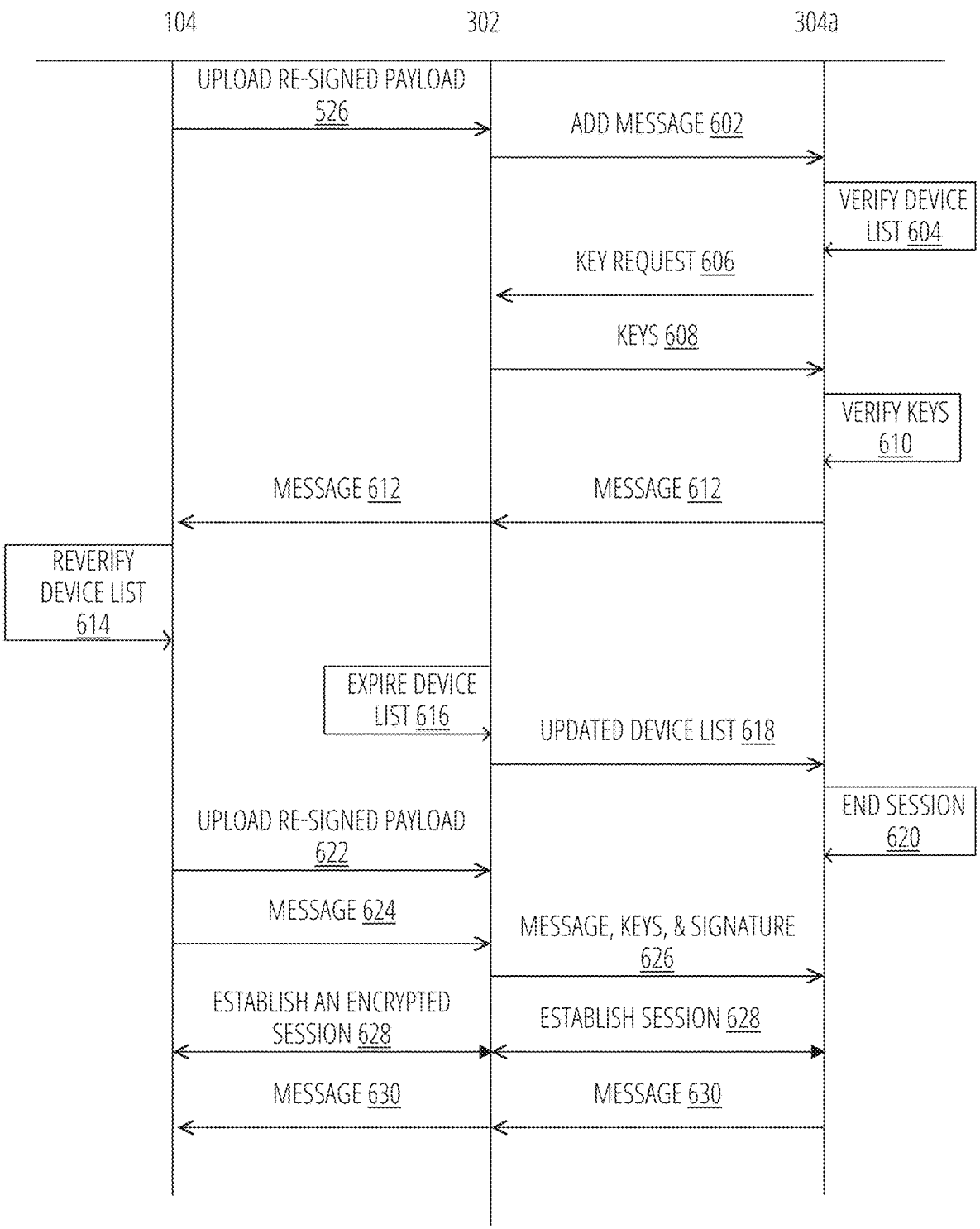
FIG. 6 is a data flow diagram depicting a secondary device interacting with other participants in a conversation in accordance with one embodiment.

Next, FIG. 6 depicts various aspects of the secondary device 104 interacting with recipient participant devices 304a in the messaging system. FIG. 6 depicts a number of techniques and processes that support the verification process, including adding the secondary device 104 into an existing conversation and a new conversation, separately transmitting keys and device lists, lazily verifying device keys, reverification of device lists, and expiring devices from a device list.

The process may begin when the secondary device 104 uploads the re-signed payload 526. If the user associated with the secondary device 104 is already participating in one or more active encrypted communication sessions (e.g., via the primary device 102 or a different secondary device 104, then the server 302 may send one or more ADD messages 602 to the participant devices 304a of those conversations.

The ADD messages may identify that a new device has been authorized on the user's account, and may provide a list of authorized devices. The list may include the identity keys of the authorized devices, or some other identifier allowing the devices to be recognized by, and communicate with, the secondary devices 104 authorized by the primary device 102.

In some embodiments, the ADD message does not provide any encryption keys for use with the devices. This is because the encryption keys are generally of a much larger size than the device lists. By sending the encryption keys later in the process, after the device list is being verified, the system can delay processing of the keys until it becomes necessary to verify them. Thus, the participant device 304a can lazily process the key lists and avoiding the need to perform the processing in the case where the participant device 304a is unable to verify the device list in the first place.

The participant device 304a may verify the device list 604 received from the server 302. Because the participant device 304a already has an encrypted session with the primary device 102 of the user account, the participant device 304a already has access to the identity key of the primary device 102 that signed the device list. Accordingly, the participant device 304a can verify the signature on the device list and ensure that the list of devices is legitimate. If the device list signature does not match the signature expected by the participant device 304a, the participant device 304a can reject the device list and take appropriate corrective action. For example, the participant device 304a might display a warning message informing a user that the conversation may have been infiltrated by an unauthorized device, require that devices on the list reauthenticate, and may refuse to receive messages from, or send messages to, the unauthorized device. The participant device 304a may also flag the problem to the server 302 and/or the primary device 102.

Assuming that the participant device 304a is able to verify the device list, the participant device 304a may at some point need to send a message to (or receive a message from) the participant device 304a. Accordingly, the participant device 304a may optionally submit a key request 606 to the server 302, requesting the encryption key(s) for the secondary device 104. Alternatively, the server 302 could provide the keys, unprompted, after providing the device list, or the keys could be provided as part of a message from the secondary device 104. In response to the key request 606, the server 302 may retrieve the encryption keys for the requested device and may transmit the the requested keys 608 to the participant device 304a.

The participant device 304a may then verify the keys 610 received from the server 302. For example, each of the identity keys of the secondary devices 104 associated with a primary device 102 may be signed by the primary device 102 (e.g., using the identity key of the primary device 102). This establishes a chain of trust from the primary device 102 to the secondary devices 104. The participant device 304a may use the identity key of the primary device 102 to verify the signatures and therefore verify that the identity keys of the secondary devices 104 are valid.

The participant device 304a may then transmit a message 612 to the secondary device 104 (potentially using the server fan-out procedure described above) by encrypting the message with the keys received from the server 302.

Each message, or a subset of messages, sent in the conversation may include the complete list of authorized devices in the conversation in metadata associated with the message; for example, the list may be in the form of a hash of the list of all the authorized devices. This allows the device list to be continuously reverified. For instance, when the message 612 is received at the secondary device 104, the secondary device 104 may retrieve the hash of the authorized device list from the message and may calculate its own hash of an authorized device list that the secondary device 104 has been maintaining locally. If the two hashes match, then the secondary device 104 may verify that the device list is as expected. If not, then the secondary device 104 may detect that an unauthorized device has been added to the conversation, and may display a warning message and/or take other corrective action as described above.

As previously discussed, each of the signed device lists maintained by the server 302 may be associated with a time stamp. Under certain conditions, the server 302 may cause the signed device lists to automatically expire. For example, if the device list was created more than a predetermined period of time ago (e.g., 3 months, 3 weeks, 1 week, or a few days, depending on the application), the server 302 may expire the device list 616. This may cause the device list to be deleted from the server 302, along with associated information such as keys for secondary devices 104 that are no longer valid for use with the user account.

In addition to, or as an alternative to, automatically expiring a device list, a device may manually cause its entry to expire. For example, device may manually or automatically log out of the user's account on the messaging service on the secondary device 104. In this circumstance, the messaging service may destroy the encryption keys locally stored on the secondary device 104. Additionally or alternatively, the server 302 may expire any device lists that include the secondary device 104 that just logged out; if necessary, the server 302 may prompt the primary device 102 to provide an updated signed device list after informing the primary device 102 that the secondary device 104 has been removed.

When a device list expires, potentially causing some secondary devices 104 to no longer be authorized for use with the user's account, the server 302 may send an updated device list 618 to the participant device 304a. This may inform the participant device 304a that it needs to update its own internal list of authorized devices that can participate in the conversation. Instead of, or in addition to, an updated device list, the server 302 may send the identities of any removed devices.

In this example, the server 302 expires the device list that includes the secondary device 104, and the participant device 304a subsequently terminates its encrypted session with the primary device 102 associated with the secondary device 104. After the encrypted session is terminated, the secondary device 104 is re-added to the authorized device list when it uploads a re-signed payload 622.

The secondary device 104 may then transmit a message 624 into a conversation that includes the participant device 304a. At this point, the participant device 304a does not have a session established with the primary device 102 or secondary device 104.

Accordingly, the server 302 may distribute the message, along with with identity keys for the primary device 102 and secondary device 104, and the signed device list. The participant device 304a may verify the signed device list and use the received keys to establish an encrypted session 628 with the primary device 102 and the secondary device 104. The participant device 304a can then continue to use the received keys to transmit messages 630 into the conversation.

Although the processes in FIG. 6 are depicted in a particular order, it is contemplated that these processes can be rearranged and used as appropriate conditions arise in the messaging system.

Figure 7:
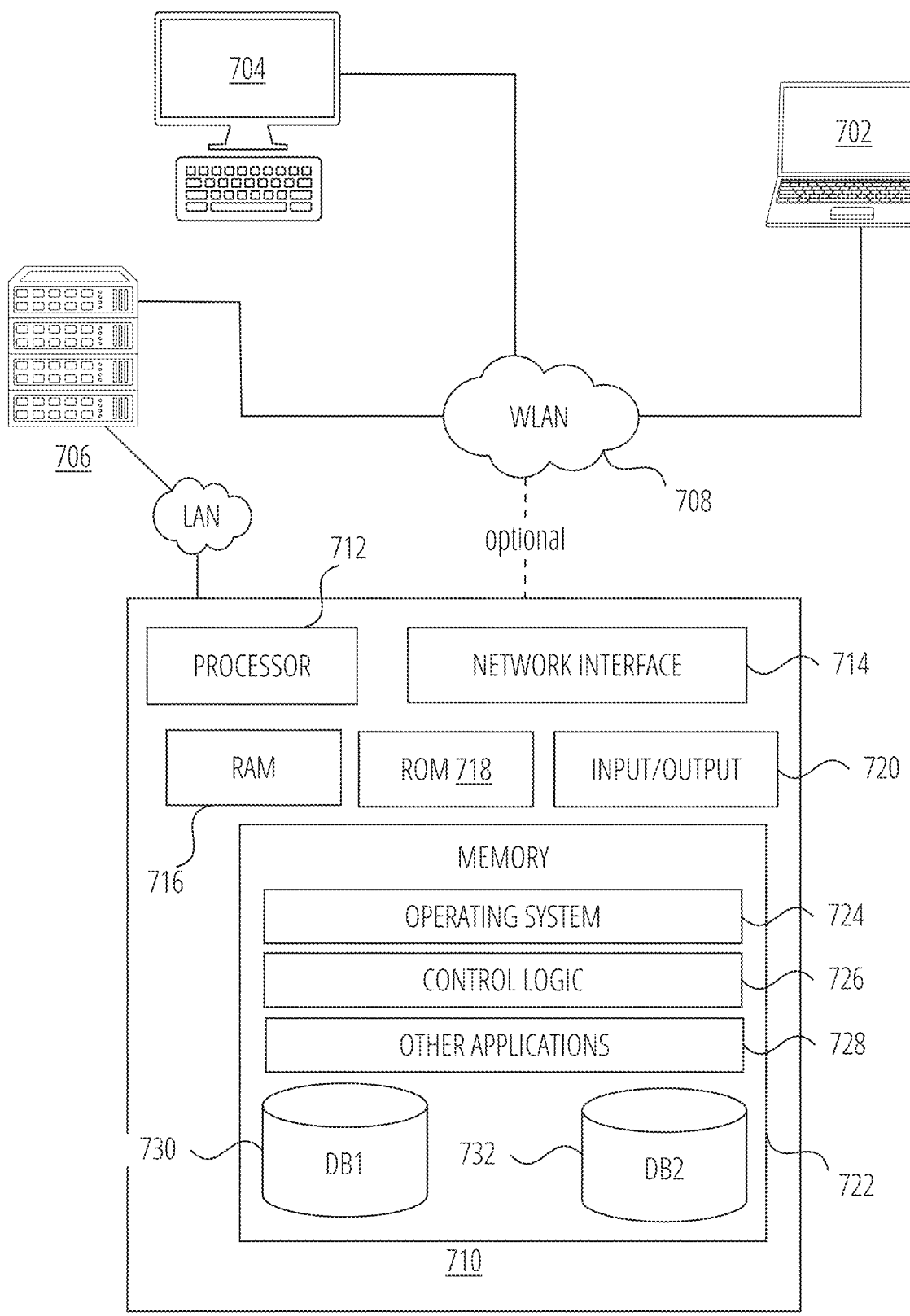
FIG. 7 depicts an illustrative computer system architecture that may be used to practice exemplary embodiments described herein.

FIG. 7 illustrates one example of a system architecture and data processing device that may be used to implement one or more illustrative aspects described herein in a stand-alone and/or networked environment. Various network nodes, such as a data server 710, web server 706, computer 704, and mobile device 702 may be interconnected via a wide area network 708 (WAN), such as the internet. Other networks may also or alternatively be used, including private intranets, corporate networks, LANs, metropolitan area networks (MANs) wireless networks, personal networks (PANs), and the like. The network 708 and devices shown are illustration purposes and may be replaced with fewer or additional computer networks or devices. A local area network (LAN) may have one or more of any known LAN topologies and may use one or more of a variety of different protocols, such as ethernet. The data server 710, web server 706, computer 704, mobile device 702 and other devices (not shown) may be connected to one or more of the networks via twisted pair wires, coaxial cable, fiber optics, radio waves or other communication media.

Computer software, hardware, and networks may be utilized in a variety of different system environments, including standalone, networked, remote-access (aka, remote desktop), virtualized, and/or cloud-based environments, among others.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The data server 710 may provide overall access, control and administration of databases and control software for performing one or more illustrative aspects described herein. The data server 710 may be connected to the web server 706, through which users interact with and obtain data as requested. Alternatively, the data server 710 may act as a web server itself and be directly connected to the internet. The data server 710 may be connected to the web server 706 through the network 708 (e.g., the internet), via direct or indirect connection, or via some other network. Users may interact with the data server 710 using the remote computer 704 or mobile device 702, e.g., using a web browser to connect to the data server 710 via one or more externally exposed web sites hosted by web server 706.

The client computer 704 or mobile device 702 may be used in concert with the data server 710 to access data stored therein, or may be used for other purposes. For example, from the client computer 704, a user may access the web server 706 using an internet browser, as is known in the art, or by executing a software application that communicates with web server 706 and/or data server 710 over a computer network (such as the internet).

Servers and applications may be combined on the same physical machines, and retain separate virtual or logical addresses, or may reside on separate physical machines. FIG. 7 illustrates just one example of a network architecture that may be used, and those of skill in the art will appreciate that the specific network architecture and data processing devices used may vary, and are secondary to the functionality that they provide, as further described herein. For example, services provided by the web server 706 and data server 710 may be combined on a single server.

Each of the illustrated devices may be any type of known computer, server, or data processing device. The devices may each include a hardware processor 712 controlling overall operation of the device. The device may further include RAM 716, ROM 718, a network interface 714, input/output interfaces 720 (e.g., keyboard, mouse, display, printer, etc.), and memory 722.

Input/output interfaces 720 may include a variety of interface units and drives for reading, writing, displaying, and/or printing data or files.

The RAM 716, ROM 718, and Memory 722 may be non-transitory computer-readable mediums storing instructions configured to cause the respective devices to perform the techniques described herein, and may further store operating system software 724 for controlling overall operation of the data server 710, control logic 726 for instructing data server 710 to perform aspects described herein, and other application software 728 providing secondary, support, and/or other functionality which may or may not be used in conjunction with aspects described herein. Functionality of the devices may refer to operations or decisions made automatically based on rules coded into the control logic, made manually by a user providing input into the system, and/or a combination of automatic processing based on user input (e.g., queries, data updates, etc.).

Memory 722 may also store data used in performance of one or more aspects described herein, including a first database 732 and a second database 730. In some embodiments, the first database may include the second database (e.g., as a separate table, report, etc.). That is, the information can be stored in a single database, or separated into different logical, virtual, or physical databases, depending on system design. The illustrated devices may each have similar or different architecture to those described. Those of skill in the art will appreciate that the functionality as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

The embodiments described above may be performed by a messaging architecture, an example of which is next described with reference to FIG. 8.

Figure 8:
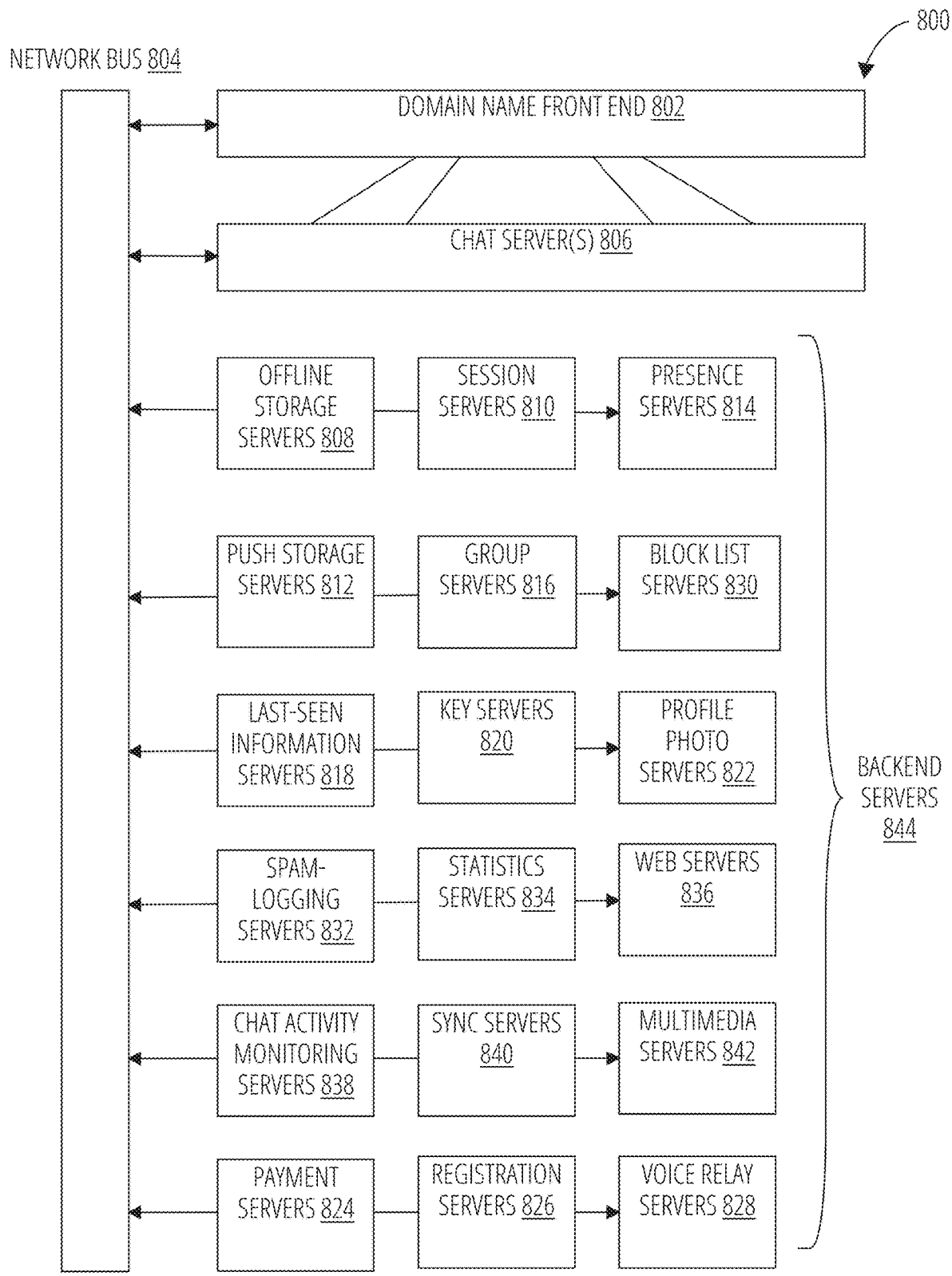
FIG. 8 illustrates an exemplary messaging service 800 in accordance with one embodiment.

FIG. 8 illustrates an embodiment of a plurality of servers implementing various functions of a messaging service 800 suitable for use with exemplary embodiments. It will be appreciated that different distributions of work and functions may be used in various embodiments of a messaging service 800.

The messaging service 800 may comprise a domain name front end 802. The domain name front end 802 may be assigned one or more domain names associated with the messaging service 800 in a domain name system (DNS). The domain name front end 802 may receive incoming connections and distribute the connections to servers providing various messaging services.

The messaging service 800 may comprise one or more chat server(s) 806. The chat server(s) 806 may comprise front-end servers for receiving and transmitting user-to-user messaging updates such as chat messages. Incoming connections may be assigned to the chat server(s) 806 by the domain name front end 802 based on workload balancing.

The messaging service 800 may comprise backend servers 844. The backend servers 844 may perform specialized tasks in the support of the chat operations of the front-end chat server(s) 806. A plurality of different types of backend servers 844 may be used. It will be appreciated that the assignment of types of tasks to different backend servers 844 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated backend servers 844 described herein may be divided between different servers of different server groups.

The messaging service 800 may comprise one or more offline storage servers 808. The one or more offline storage servers 808 may store messaging content for currently-offline messaging clients in hold for when the messaging clients reconnect.

The messaging service 800 may comprise one or more session servers 810. The one or more session servers 810 may maintain a session state of connected messaging clients.

The messaging service 800 may comprise one or more presence servers 814. The one or more presence servers 814 may maintain presence information for the messaging service 800. Presence information may correspond to user-specific information indicating whether or not a given user has an online messaging client and is available for chatting, has an online messaging client but is currently away from it, does not have an online messaging client, and any other presence state.

The messaging service 800 may comprise one or more push storage servers 812. The one or more push storage servers 812 may cache push requests and transmit the push requests to messaging clients. Push requests may be used to wake messaging clients, to notify messaging clients that a messaging update is available, and to otherwise perform server-side-driven interactions with messaging clients.

The messaging service 800 may comprise one or more group servers 816. The one or more group servers 816 may maintain lists of groups, add users to groups, remove users from groups, and perform the reception, caching, and forwarding of group chat messages.

The messaging service 800 may comprise one or more block list servers 830. The one or more block list servers 830 may maintain user-specific block lists, the user-specific incoming-block lists indicating for each user the one or more other users that are forbidden from transmitting messages to that user. Alternatively or additionally, the one or more block list servers 830 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 800 may comprise one or more last seen last-seen information servers 818. The one or more last seen last-seen information servers 818 may receive, store, and maintain information indicating the last seen location, status, messaging client, and other elements of a user's last seen connection to the messaging service 800.

The messaging service 800 may comprise one or more key servers 820. The one or more key servers may host public keys for public/private key encrypted communication.

The messaging service 800 may comprise one or more profile photo servers 822. The one or more profile photo servers 822 may store and make available for retrieval profile photos for the plurality of users of the messaging service 800.

The messaging service 800 may comprise one or more spam-logging servers 832. The one or more spam-logging servers 832 may log known and suspected spam (e.g., unwanted messages, particularly those of a promotional nature). The one or more spam-logging servers 832 may be operative to analyze messages to determine whether they are spam and to perform punitive measures, in some embodiments, against suspected spammers (users that send spam messages).

The messaging service 800 may comprise one or more statistics servers 834. The one or more statistics servers may compile and store statistics information related to the operation of the messaging service 800 and the behavior of the users of the messaging service 800.

The messaging service 800 may comprise one or more web servers 836. The one or more web servers 836 may engage in hypertext transport protocol (HTTP) and hypertext transport protocol secure (HTTPS) connections with web browsers.

The messaging service 800 may comprise one or more chat activity monitoring servers 838. The one or more chat activity monitoring servers 838 may monitor the chats of users to determine unauthorized or discouraged behavior by the users of the messaging service 800. The one or more chat activity monitoring servers 838 may work in cooperation with the spam-logging servers 832 and block list servers 830, with the one or more chat activity monitoring servers 838 identifying spam or other discouraged behavior and providing spam information to the spam-logging servers 832 and blocking information, where appropriate to the block list servers 830.

The messaging service 800 may comprise one or more sync servers 840. The one or more sync servers 840 may sync the messaging service 800 with contact information from a messaging client, such as an address book on a mobile phone, to determine contacts for a user in the messaging service 800.

The messaging service 800 may comprise one or more multimedia servers 842. The one or more multimedia servers may store multimedia (e.g., images, video, audio) in transit between messaging clients, multimedia cached for offline endpoints, and may perform transcoding of multimedia.

The messaging service 800 may comprise one or more payment servers 824. The one or more payment servers 824 may process payments from users. The one or more payment servers 824 may connect to external third-party servers for the performance of payments.

The messaging service 800 may comprise one or more registration servers 826. The one or more registration servers 826 may register new users of the messaging service 800.

The messaging service 800 may comprise one or more voice relay servers 828. The one or more voice relay servers 828 may relay voice-over-internet-protocol (VoIP) voice communication between messaging clients for the performance of VoIP calls.

In some embodiments, the messaging service 800 may be an end-to-end encrypted (E2EE) messaging service, in which a sending device encrypts information for decryption by a receiving device. The intermediate servers of the messaging service 800 may assist in the setup of an E2EE session, and may facilitate delivery of communications between the devices, but may be unable to decrypt (and therefore access) the content of the communications. In an E2EE environment, some adjustments may need to be made to procedures that would be performed by the server in a non-E2EE environment (eliminating these procedures, adjusting them, or moving them to one or more of the client devices).

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art will recognize that many further combinations and permutations are possible. Accordingly, the novel architecture is intended to embrace all such alterations, modifications and variations that fall within the spirit and scope of the appended claims.

What is claimed is:

1. A method comprising:

accessing, at a server of an encrypted messaging system, a payload including at least a list of authorized devices associated with a user, a cryptographic signature, wherein the list of authorized devices are cryptographically signed by a primary device of the user using a pairing key, the cryptographic signature is associated with a timestamp and each device in the list of authorized devices is associated with a cryptographic key, and the payload is encrypted using the pairing key;

identifying a time window during which the cryptographic signature remains valid;

determining whether a current time is within the time window;

if the current time is within the time window, allowing immediate communication between the server and an authorized device in the list of authorized devices;

if the current time is not within the time window, expiring the list of authorized devices;

destroying the cryptographic key associated with the authorized device in the list of authorized devices based on a request to manually retire the authorized device from the list of authorized devices; and generating an updated list of authorized devices.

2. The method of claim 1, further comprising:

receiving a message for the user;

determining that the current time is within the time window; and forwarding the message to each of the devices in the list of authorized devices.

3. The method of claim 1, wherein the cryptographic key is stored on the server.

4. The method of claim 3, further comprising:

receiving the request, at the server, from the other device in the list of authorized devices to manually retire the other device from the list of authorized devices, wherein the other device is a logged-in device; and in response to the request, logging the other device out and expiring one or more authorized device lists that include the other device.

5. The method of claim 3, further comprising:

determining an amount of time since a selected device from the list of authorized devices was last online;

determining that the amount of time exceeds a predetermined maximum amount of time; and destroying the cryptographic key associated with the selected device.

6. The method of claim 1, further comprising:

receiving a request to add a new device to the list of authorized devices;

authorizing the request and adding the new device to the list;

waiting a predetermined period of time after authorizing the request; and transmitting a notification that the new device has been added to the list to the primary device after the predetermined period of time has elapsed.

7. The method of claim 6, further comprising:

receiving a response to the notification from the primary device requesting that the new device be removed from the list of authorized devices; and removing the new device from the authorized device list.

8. A non-transitory computer-readable medium storing instructions configured to cause a processor to:

access, at a server of an encrypted messaging system, a payload including at least a list of authorized devices associated with a user, a cryptographic signature, wherein the list of authorized devices are cryptographically signed by a primary device of the user using a pairing key, the cryptographic signature is associated with a timestamp and each device in the list of authorized devices is associated with a cryptographic key, and the payload is encrypted using the pairing key;

identify a time window during which the cryptographic signature remains valid;

determine whether a current time is within the time window;

if the current time is within the time window, allow immediate communication between the server and an authorized device in the list of authorized devices;

if the current time is not within the time window, expire the list of authorized devices;

destroy the cryptographic key associated with the authorized device in the list of authorized devices based on a request to manually retire the authorized device from the list of authorized devices; and generate an updated list of authorized devices.

9. The medium of claim 8, further storing instructions configured to cause the processor to:

receive a message for the user;

determine that the current time is within the time window; and forward the message to each of the devices in the list of authorized devices.

10. The medium of claim 8, wherein the cryptographic key is stored on the server.

11. The medium of claim 10, further storing instructions configured to cause the processor to:

receive the request, at the server, from the other device in the list of authorized devices to manually retire the other device from the list of authorized devices, wherein the other device is a logged-in device; and in response to the request, log the other device out and expire one or more authorized device lists that include the other device.

12. The medium of claim 10, further storing instructions configured to cause the processor to:

determine an amount of time since a selected device from the list of authorized devices was last online;

determine that the amount of time exceeds a predetermined maximum amount of time; and destroy the cryptographic key associated with the selected device.

13. The medium of claim 8, further storing instructions configured to cause the processor to:

receive a request to add a new device to the list of authorized devices;

authorize the request and adding the new device to the list;

wait a predetermined period of time after authorizing the request; and transmit a notification that the new device has been added to the list to the primary device after the predetermined period of time has elapsed.

14. The medium of claim 13, further storing instructions configured to cause the processor to:

receive a response to the notification from the primary device requesting that the new device be removed from the list of authorized devices; and remove the new device from the authorized device list.

15. An apparatus comprising:
a processor; and
a non-transitory computer-readable medium storing instructions configured to cause the processor to:
   access, at a server of an encrypted messaging system, a payload including at least a list of authorized devices associated with a user, a cryptographic signature, wherein the list of authorized devices are cryptographically signed by a primary device of the user using a pairing key, the cryptographic signature is associated with a timestamp and each device in the list of authorized devices is associated with a cryptographic key, and the payload is encrypted using the pairing key;
   identify a time window during which the cryptographic signature remains valid;
   determine whether a current time is within the time window;
   if the current time is within the time window, allow immediate communication between the server and an authorized device in the list of authorized devices;
   if the current time is not within the time window, expire the list of authorized devices;
   destroy the cryptographic key associated with the authorized device in the list of authorized devices based on a request to manually retire the authorized device from the list of authorized devices; and
   generate an updated list of authorized devices.

16. The apparatus of claim 15, wherein the processor further stores instructions configured to cause the processor to:
   receive a message for the user;
   determine that the current time is within the time window; and
   forward the message to each of the devices in the list of authorized devices.

17. The apparatus of claim 15, wherein the cryptographic key is stored on the server.

18. The apparatus of claim 17, wherein the processor further stores instructions configured to cause the processor to:
   receive the request, at the server, from the other device in the list of authorized devices to manually retire the other device from the list of authorized devices, wherein the other device is a logged-in device; and
   in response to the request, log the other device out and expire one or more authorized device lists that include the other device.

19. The apparatus of claim 17, wherein the processor further stores instructions configured to cause the processor to:
   determine an amount of time since a selected device from the list of authorized devices was last online;
   determine that the amount of time exceeds a predetermined maximum amount of time; and
   destroy the cryptographic key associated with the selected device.

20. The apparatus of claim 15, wherein the processor further stores instructions configured to cause the processor to:
   receive a request to add a new device to the list of authorized devices;
   authorize the request and adding the new device to the list;
   wait a predetermined period of time after authorizing the request; and
   transmit a notification that the new device has been added to the list to the primary device after the predetermined period of time has elapsed.

* * * * *